United States Patent [19]
Bowen et al.

[11] Patent Number: 5,770,850
[45] Date of Patent: Jun. 23, 1998

[54] SENSOR ARRAY TRACKING AND DETECTION SYSTEM HAVING AN ALIGNMENT POSITIONER

[75] Inventors: Donald John Bowen, Madison; Gregory M. Durant, Plainfield; Christopher L. Rutledge, Somerset, all of N.J.

[73] Assignee: AT&T Corp, Middletown, N.J.

[21] Appl. No.: 846,937

[22] Filed: Apr. 30, 1997

[51] Int. Cl.[6] .................................................. G01J 1/20
[52] U.S. Cl. .................................. 250/203.1; 250/206.1; 356/139.04
[58] Field of Search ........................ 250/203.1–203.7, 250/201.5, 206.1–206.3, 208.2, 548, 216; 356/139.04–139.08; 359/159

[56] References Cited

U.S. PATENT DOCUMENTS 5,559,322   9/1996   Jacoby et al. ..................... 250/203.6

*Primary Examiner*—Que Le
*Attorney, Agent, or Firm*—Alfred G. Steinmetz

[57] ABSTRACT

A system is provided for tracking a free-space optical communications beam. The incoming beam is split by a beam splitter. One portion of the incoming beam is focused onto a high-speed photodetector. Another portion of the incoming beam is passed through a target pattern optical element. A resulting target pattern is formed on a two-dimensional active pixel sensor array. The alignment of the system can be adjusted based on the position of the target pattern on the sensor array.

30 Claims, 5 Drawing Sheets

SENSOR ARRAY TRACKING AND DETECTION SYSTEM HAVING AN ALIGNMENT POSITIONER

FIELD OF THE INVENTION

This invention relates to optical beam tracking and detection, and more particularly, to tracking and detecting optical beams used in free-space optical telecommunications systems.

BACKGROUND OF THE INVENTION

Free-space optical communications systems can be used to provide telecommunications services in areas in which it is difficult or expensive to hard-wire new customers to the existing telecommunications infrastructure. The optical transmitters and receivers in such systems must be aligned to function properly. Previously known devices for tracking optical beams have used quadrant detectors, which can be imprecise and which can be difficult to integrate with high-speed photodetectors.

It is therefore an object of the present invention to provide an improved arrangement for tracking and detecting optical beams in telecommunications systems.

SUMMARY OF THE INVENTION

This and other objects of the invention are accomplished in accordance with the principles of the present invention by providing a system for maintaining the alignment of a free-space optical receiver with a source of an optical communications signal using a two-dimensional active pixel array sensor.

A telescope is used to collimate the incoming light beam from a source such as a modulated diode laser prior to splitting the beam with a beam splitter. One portion of the beam (the data beam) is directed toward a high-speed photodetector, the alignment of which it is desired to maintain during operation of the system. Another portion of the beam (the tracking beam) is directed through a target pattern optical element. The target pattern optical element causes a target pattern to be formed on the active pixel sensor array. The location of the target pattern on the sensor array is used to determine the amount of misalignment of the system.

The target pattern optical element may be formed from a holographic optical element that generates a cross-shaped pattern when illuminated. Alternatively, the target pattern optical element may be based on a cylindrical lens. If desired, a variable focal length lens may be used to increase the intensity of the beam as it is received by the sensor array, thereby helping the system to overcome the noise threshold of the pixels in the sensor array.

Data is primarily received by the high speed photodetector while system alignment is maintained by the sensor array arrangement. However, data may also be obtained by processing the data received by the sensor array. This capability may be used in situations in which the high-speed photodetector is not operating properly, but in which it is still desired to send data to the system.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
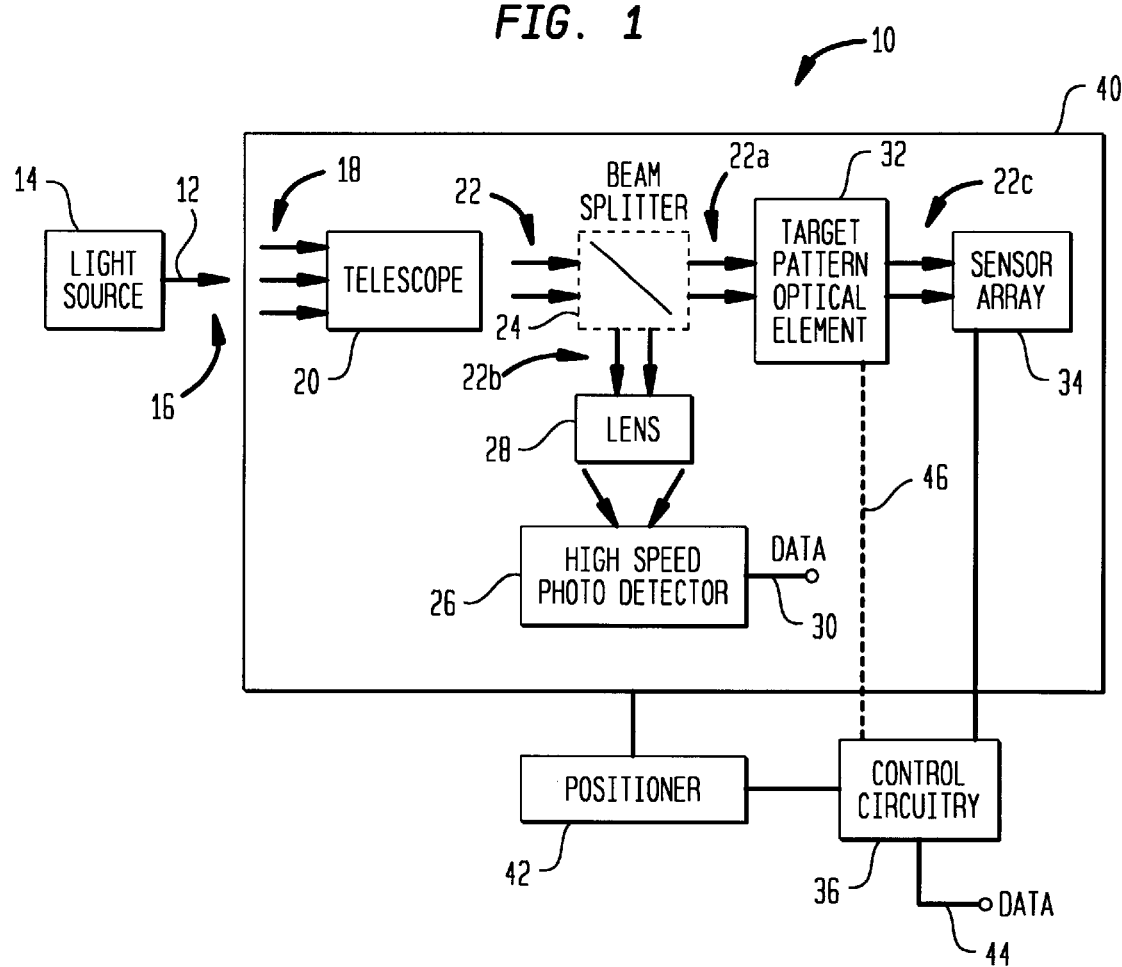
FIG. 1 is a block diagram of a system in accordance with the present invention.

An illustrative beam tracking and detection system 10 in accordance with the present invention is shown in FIG. 1. A modulated light beam 12 is generated by a laser diode or other suitable light source 14. Beam 12 propagates through free space (air) 16 for a distance in the range of about ten to a few thousand meters, thereby diverging slightly to form an expanded beam 18. The diameter of beam 18 is approximately a few inches at the entrance to telescope 20.

Telescope 20 receives beam 18 and provides a corresponding collimated beam 22 having a diameter of approximately half of an inch. Beam 22 may be split into tracking beam 22a and data beam 22b by beam splitter 24. Beam 22b is focused onto the active region of high-speed photodetector 26 by lens 28. As defined herein, the term "high-speed" refers to speeds greater than 1 kHz and preferably on the order of several hundred MHz. Data is provided at output 30 of photodetector 26. System 10 can be used to carry any desired type of data, such data for providing plain old telephone service (POTS), video, integrated services digital network (ISDN) services, etc.

System 10 has tracking capabilities to ensure that the optical components of system 10 are properly aligned with light source 14. While data is received by photodetector 26, target pattern optical element 32 receives beam 22a and generates a corresponding beam 22c. Beam 22c forms a target pattern on sensor array 34. The target pattern falls in the center of sensor array 32 when system 10 is properly aligned. The target pattern falls off-center when system 10 is out of alignment. Control circuitry 36 is used to determine the extent of such misalignment by analyzing the location of the off-center target pattern.

System components 20, 24, 26, 28, 32, and 34 are preferably mounted on a common housing or structure 40, so that the relative positions of these components remains fixed while structure 40 is aligned with light source 14. The orientation of structure 40 may be controlled by positioner 42, which receives position feedback control signals from control circuitry 36.

If desired, relatively low data rate information encoded on beam 22c can be detected by combining the signals from the illuminated pixels in sensor array 34. Control circuitry 36 analyzes pixel information from sensor array 34 and generates corresponding data at output 44. The data rate that can be supported by this approach is generally on the order of half of the frame rate of sensor array 34. Because this mode of data detection is independent of the data detection performed by high speed photodetector 30, the data generated at output 44 may be used to provide backup data should high speed photodetector 30 fail. In addition, any other desired type of data may be detected by sensor array 34 and provided at data output 44. If high speed data communications are not required, sensor array 34 can be used as the sole data sensor in the system.

Target pattern optical element 32 may use fixed-position optical components such as a cylindrical lens or holographic optical element. Alternatively, a controllable positioner (not shown in FIG. 1) can be used to control the position of optical components within target pattern optical element 32. If a controllable positioner is used in target pattern optical element 32, suitable control signals can be provided to target pattern optical element 32 via signal path 46.

Sensor array 34 is preferably an active pixel sensor, such as available from VVL Technologies of Sweden. In active pixel sensors, rows of pixel data can be read out from the array using on-chip buffer circuitry. The pixel value for a given column in the row can be determined by accessing the appropriate register for that column within the buffer. The number of pixels used in sensor 34 depends on the optical characteristics of system 10. As an illustrative example, sensor array 34 may have 1000 rows and 1000 columns of pixels. Sensor array 34 is typically formed from silicon. A suitable compatible light source 14 (FIG. 1) is a gallium arsenide laser diode producing an output wavelength of approximately 0.8 $\mu$m.

Although illustrated as separate components in FIG. 1, the target pattern optical element and telescope optics may be formed as an integral component, if desired. Similarly, the optical functions of beam splitter 24 and lens 28 may be provided as part of an integrally formed telescope or other suitable structure. In addition, control circuitry 36, which is illustrated as being separate from structure 40 may alternatively be mounted in whole or part on structure 40.

Figure 2:
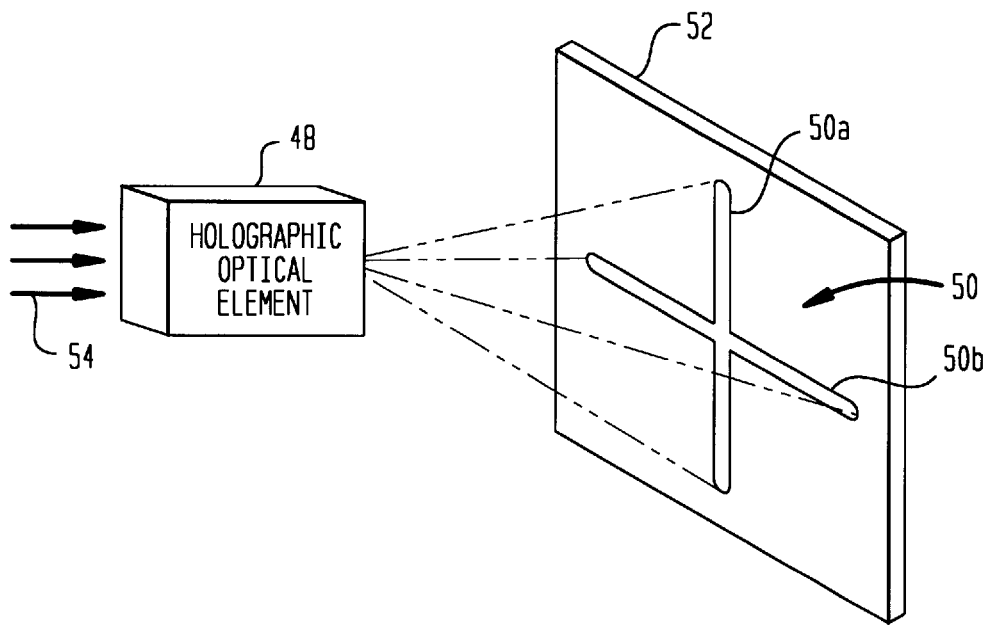
FIG. 2 is a perspective view of a portion of an illustrative system in accordance with the present invention.

FIG. 2 shows an embodiment of the present invention in which target pattern optical element 32 of FIG. 1 is formed by holographic optical element 48. Holographic optical element 48 generates a cross-shaped target pattern 50 on sensor array 52 when illuminated by tracking beam 54. The cross-shaped target pattern 50 facilitates the analysis of target pattern 50 by control circuitry 36 (FIG. 1) to determine the alignment of the system. Horizontal alignment information can be obtained by identifying which pixel in a given row has the highest intensity, because this pixel is located at the point of intersection between vertical portion 50a and the row. Vertical orientation information can be obtained by identifying which row contains almost entirely high-intensity pixels, because that row is aligned with horizontal portion 50b.

Figure 3:
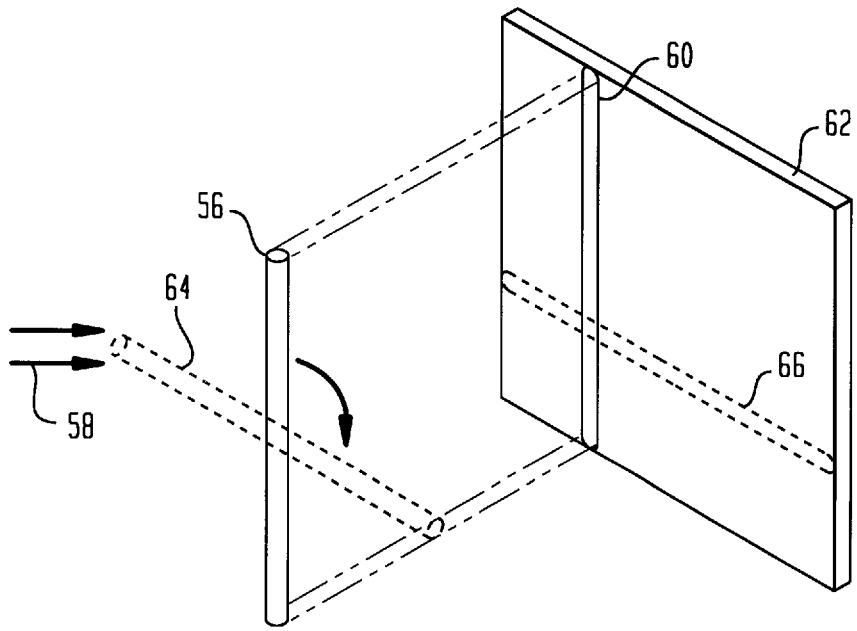
FIG. 3 is a perspective view of a portion of another illustrative system in accordance with the present invention.

If desired, other suitable target patterns may be produced by using other arrangements of optical components to form target pattern optical element 32 of FIG. 1. FIG. 3 shows an embodiment of the present invention in which target pattern optical element 32 of FIG. 1 is formed by cylindrical lens 56, which is illuminated by beam 58. When vertically oriented, cylindrical lens 56 generates a vertically oriented target pattern 60 on sensor array 62. Reading out the contents of any row that intersects target pattern 60 will immediately yield horizontal alignment information in the form of the column number for the pixel at the intersection point between the row and target pattern 60. Vertical alignment information can be obtained by analyzing each row in sensor array 62. If target pattern 60 intersects the top rows of sensor array 62, but does not intersect the bottom rows (or vice versa), the system is not properly aligned in the vertical dimension.

Although cylindrical lens 56 may be provided in a vertical orientation during initial alignment of the system, cylindrical lens 56 is preferably rotated 90° about the longitudinal axis of the optical path into horizontal position 64 for subsequent beam tracking operations. In horizontal position 64, cylindrical lens 56 generates horizontally oriented target pattern 66. This orientation is typically preferred during fine positioning operations, because it is relatively straightforward to identify which row is made up entirely of high-intensity pixels and because the grouping of all pixels on a single row may enhance the ability of sensor 62 (which typically outputs data by the row) to produce a high signal-to-noise ratio.

If desired, cylindrical lens 56 may be fixed in the horizontal position 64 for both initial alignment and subsequent tracking operations. Initial alignment using a fixed horizontal configuration involves reading out pixel information for all rows in sensor array 62 to identify the row that contains horizontal target pattern 66 (to provide vertical alignment information) and analyzing the intensity distribution for the pixels in the row (to provided horizontal alignment information). Fine adjustments are performed using the same technique during subsequent alignment steps.

Figure 4:
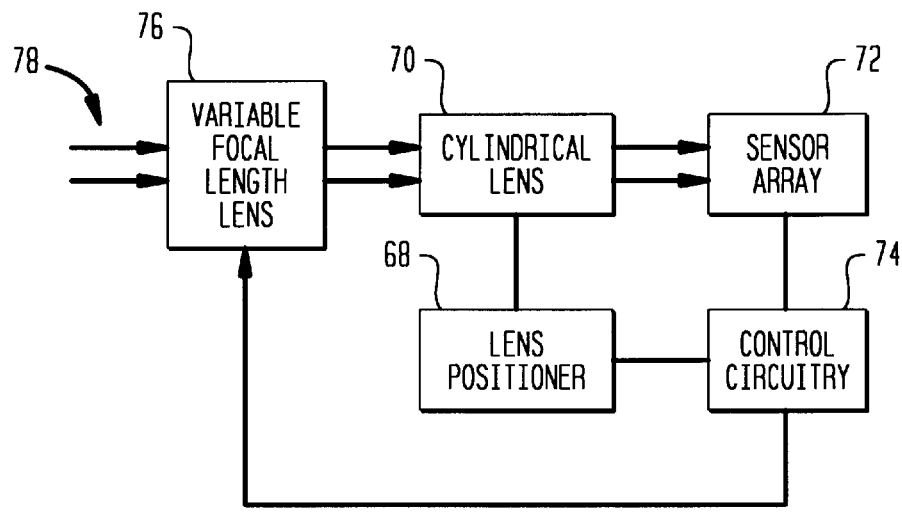
FIG. 4 is a block diagram showing additional features of the present invention.

If the cylindrical lens is rotatable, a lens positioner 68 may be used to control the orientation of cylindrical lens 70 and the resulting target pattern formed on sensor array 72, as shown in FIG. 4. Lens positioner 68 may be controlled by control commands generated by control circuitry 74.

Another possible feature of the present invention that is illustrated in FIG. 4 is the use of variable focal length lens 76, which is typically located in beam 78 between the beam splitter (not shown FIG. 4) and sensor array 72. During initial alignment, variable focal length lens 76 has a very large or infinite effective focal length, which allows beam 78 to pass unaltered, so that the target pattern assumes its maximum lateral extent in the vertical and horizontal dimensions.. During subsequent and more precise alignment steps, variable focal length lens 76 assumes a shorter effective focal length, which focuses beam 78 more tightly on sensor array 72. Focusing beam 78 more tightly increases the intensity (power per area) of the beam on the sensor array 72, thereby helping to overcome the noise threshold of the pixels in sensor array 72. Variable focal length lens 76 may be a zoom lens, one or more discrete lenses that may be selectively positioned in the beam path by a suitable positioner, or may be an electrically tunable focal length lens, such as available from LSA Incorporated of Exton, Pa.

Figure 5:
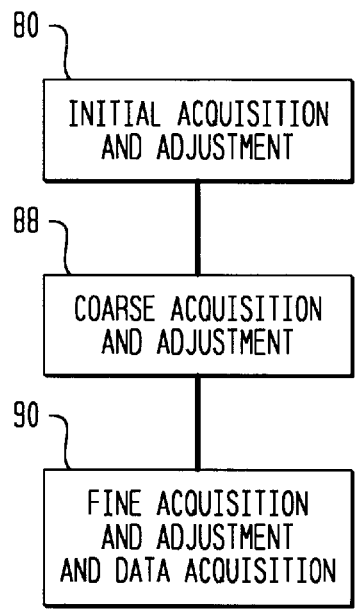
FIG. 5 is a flow chart of steps involved in the use of the present invention.

The alignment process using the system of the present invention preferably involves steps such the steps shown in FIG. 5. For clarity of presentation, the steps of FIG. 5 are described in connection with the illustrative cross-shaped target pattern and sensor array arrangement of FIGS. 6–8.

Figure 6:
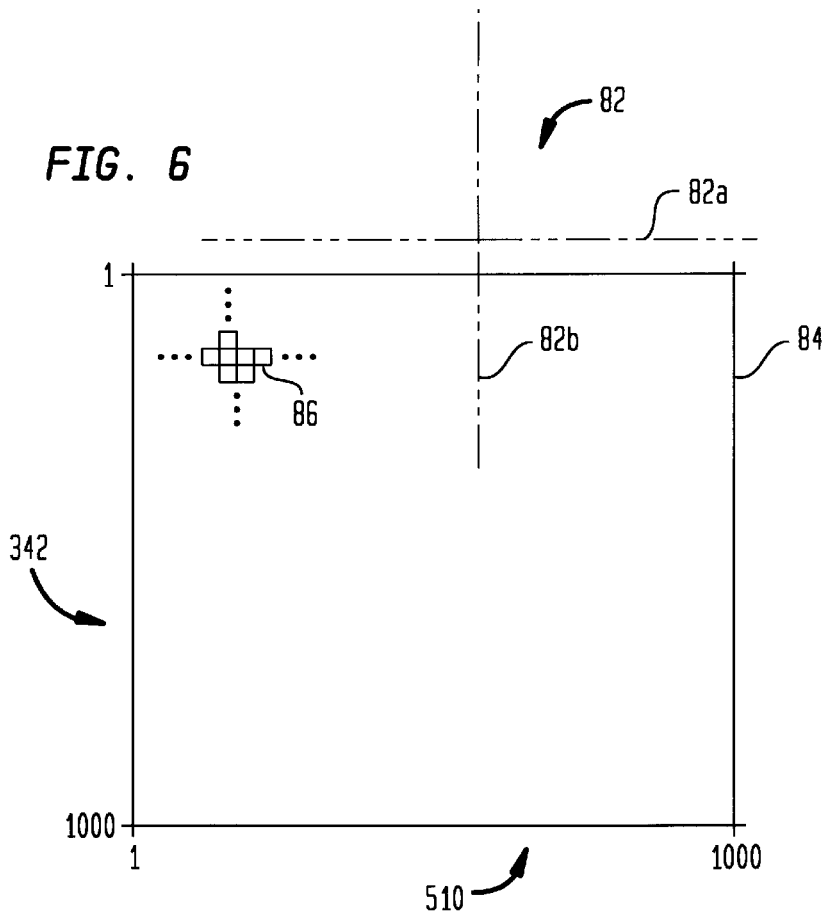
FIGS. 6–8 are simplified views of the sensor array of the present invention during tracking.

In general, the system is not initially well aligned. As shown in FIG. 6, during initial alignment information acquisition and alignment adjustment step 80, target pattern 82 only partly overlaps with sensor array 84. In particular, horizontal target pattern portion 82a falls outside the boundaries of sensor 84. The upper half of vertical target pattern portion 82b also falls outside the boundaries of sensor 84. However, the lower half of vertical target pattern portion 82b may be detected by the upper rows of sensor 84. (Although not shown separately in the FIGS. to avoid overcomplicating the drawings, it will be appreciated that there are numerous rows and columns of pixels such as pixels 86 in each sensor array of this invention.)

The light intensity in cross-shaped target pattern 82 generally tapers off radially in a Gaussian distribution. In the example of FIG. 6, the highest numbered row on which target pattern 82 can be detected is row 342. This row is identified by sequentially reading out the pixel data for each of the rows in sensor array 84. The amount of vertical misalignment in the system is determined based on this information. In the horizonal dimension, misalignment is determined by analyzing the pixel data from one or more rows in the top 342 rows to identify which column contains the pixel (or small group of pixels) resulting from the intersection of vertical target pattern portion 82b with these rows. In the example of FIG. 6, column 510 contains this pixel information. After the extent of the misalignment in the vertical and horizontal dimensions has been determined, the system (i.e., structure 40 of FIG. 1) is aligned with light source 14 (FIG. 1) using positioner 42 (FIG. 1). If no signal is detected during step 80, the system may be directed to hunt for the signal from light source 14 using a grid or spiral search pattern.

Figure 7:
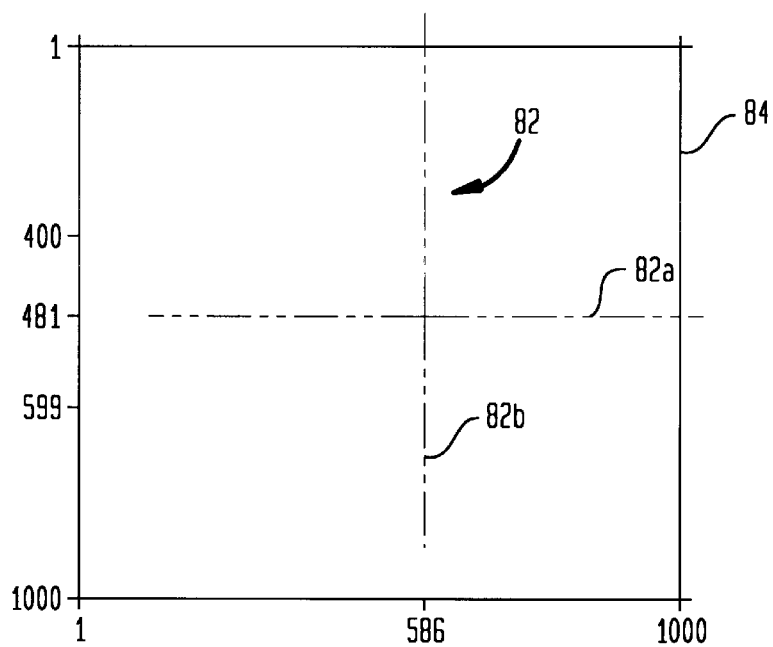

In step 88 of FIG. 5, coarse alignment information acquisition and alignment adjustment are performed. To ensure proper operation of sensor array 84, rows must typically be accessed (either to read out data or to simply flush out the pixels) once per frame at uniformly spaced clock intervals. However, frame access need not start at the first row in the array (as done in initial acquisition and adjustment step 80). As shown in FIG. 7, the process of accessing rows of data in sensor array 84 may begin at a central row of the array such as row 400, because it is expected (due to the known drift characteristics of the system) that horizontal target pattern 82a will be located within the central 200 rows of sensor array 84. This arrangement allows the position of horizontal target pattern 82a to be quickly identified. The remainder of the cycle or frame can therefore be used for processing vertical alignment information and for adjusting the alignment of the system. Typically, the frame rate of sensor 84 is approximately 100 Hz, so an individual cycle time is 0.01 seconds. In the illustrative example of FIG. 7, vertical misalignment is corrected based on the detection of horizontal target portion 82a at row 481 and horizontal misalignment is corrected based on the detection of vertical target portion 82b in column 586. If the target pattern is not located during step 88, then step 80 may be repeated.

Figure 8:
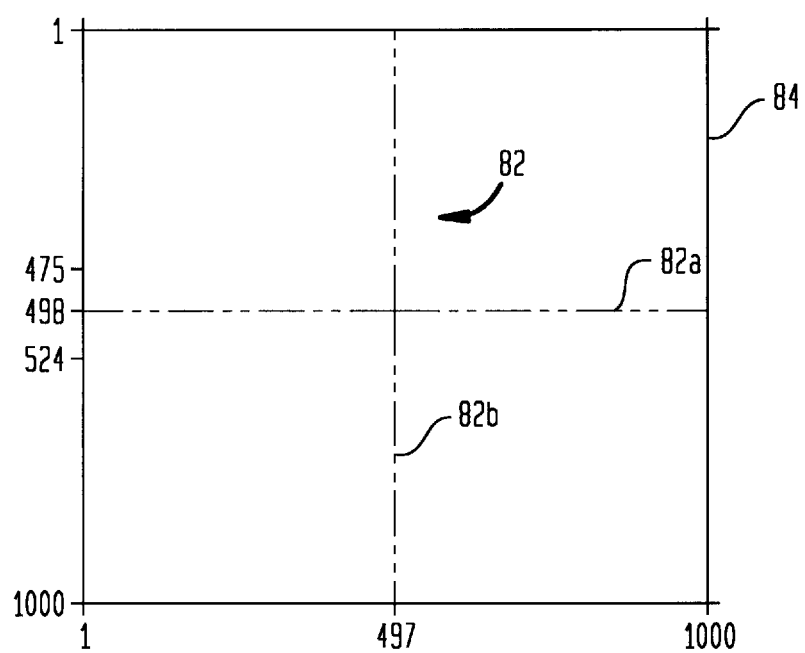

In step 90 of FIG. 5, fine alignment information acquisition and alignment adjustment are performed. As shown in FIG. 8, the process of accessing rows of data in sensor array 84 begins at row 475, because it is expected that horizontal target pattern 82a will be located within the central 50 rows of sensor array 84. This arrangement allows the position of horizontal target pattern 82a to be quickly identified. The remainder of the cycle can therefore be used for processing vertical alignment information and for adjusting the alignment of the system. In the illustrative example of FIG. 8, vertical misalignment is corrected based on the detection of horizontal target portion 82a at row 498 and horizontal misalignment is corrected based on the detection of vertical target portion 82b in column 497. If the target pattern is not located during step 90, then steps 80 and 88 may be repeated.

The fine adjustment of step 90 is preferably repeated continuously during the operation of system 10 (FIG. 1.). This allows the optics and sensors of system 10 to remain well aligned with light source 12. With system 10 in alignment, beam 22b is properly focused onto the active portion of high-speed photodetector 26 by lens 28 and data is provided at output 30.

The foregoing is merely illustrative of the principles of this invention and various modifications can be made by those skilled in the art without departing from the scope and spirit of the invention.

What is claimed is:

1. A system for use in tracking and receiving data from an incoming free-space optical communications beam which is collimated and split into a tracking beam and a data beam and in which at least part of the system is positioned relative to the incoming beam by a positioner to maintain alignment with the incoming beam, the system comprising:
   a photodetector for receiving data from the data beam;
   two-dimensional sensor array having a plurality of rows and columns of pixels;
   a target pattern optical element for receiving the tracking beam and creating a corresponding target pattern on the sensor array; and
   control circuitry for receiving pixel information from the sensor array and generating corresponding vertical and horizontal alignment information for the positioner so that the positioner maintains alignment with said incoming beam.

2. The system defined in claim 1 wherein said target pattern optical element comprises a holographic optical element.

3. The system defined in claim 1 wherein said target pattern optical element comprises a holographic optical element that creates a cross-shaped target pattern on the sensor array.

4. The system defined in claim 3 wherein said vertical alignment information is generated based on the vertical position of said cross-shaped target pattern within said rows of pixels in said sensor array.

5. The system defined in claim 3 wherein said horizontal alignment information is generated based on the horizontal position of said cross-shaped target pattern within the pixels in a given row of said sensor array.

6. The system defined in claim 1 wherein the target pattern optical element is a cylindrical lens.

7. The system defined in claim 6 further comprising a lens positioner for rotating the cylindrical lens by 90° about the longitudinal axis of the tracking beam.

8. The system defined in claim 1 further comprising a variable focal length lens in the tracking beam for selectively increasing the intensity of the tracking beam on the sensor array.

9. The system defined in claim 1 wherein said sensor array is an active pixel sensor array.

10. The system defined in claim 9 further comprising means for initiating a read-out cycle at a central row of the active pixel sensor array, so that the alignment information is obtained more quickly than when the read-out cycle is initiated near the first row of said active pixel sensor array and so that the system can be aligned during the remainder of the cycle after the alignment information is obtained.

11. The system defined in claim 1 further comprising means for performing initial alignment information acquisition and alignment adjustment for said system.

12. The system defined in claim 1 further comprising means for performing coarse alignment information acquisition and alignment adjustment for said system.

13. The system defined in claim 1 further comprising means for continuously performing fine alignment information acquisition and alignment adjustment for said system while said photodetector receives said data.

14. The system defined in claim 1 wherein said photodetector comprises a high-speed photodetector.

15. The system defined in claim 1 wherein said control circuitry comprises means for analyzing information from said sensor array to extract communications data from said tracking beam.

16. A method for tracking and receiving data from an incoming free-space optical communications beam using a system in which the incoming beam is collimated and split into a tracking beam and a data beam and in which at least part of the system is positioned relative to the incoming beam by a positioner to maintain alignment with the incoming beam, the method comprising the steps of:

receiving data from the data beam with a photodetector;

receiving the tracking beam with a target pattern optical element and creating a corresponding target pattern on a two-dimensional sensor array having a plurality of rows and columns of pixels; and receiving pixel information from the sensor array with control circuitry and generating corresponding vertical and horizontal alignment information for the positioner so that the positioner maintains alignment with said incoming beam.

17. The method defined in claim 16 wherein the step of receiving the tracking beam comprises the step of receiving the tracking beam with a holographic optical element.

18. The method defined in claim 16 wherein the step of receiving the tracking beam comprises the step of receiving the tracking beam with a holographic optical element that creates a cross-shaped target pattern on the sensor array.

19. The method defined in claim 18 further comprising the step of generating the vertical alignment information based on the vertical position of said cross-shaped target pattern within said rows of pixels in said sensor array.

20. The method defined in claim 18 further comprising the step of generating the horizontal alignment information based on the horizontal position of said cross-shaped target pattern within the pixels in a given row of said sensor array.

21. The method defined in claim 16 wherein the step of receiving the tracking beam comprises the step of receiving the tracking beam with a cylindrical lens.

22. The method defined in claim 21 further comprising the step of rotating the cylindrical lens by 90° about the longitudinal axis of the tracking beam.

23. The method defined in claim 16 further comprising the step of selectively increasing the intensity of the tracking beam on the sensor array with a variable focal length lens in the tracking beam.

24. The method defined in claim 16 wherein the step of receiving the tracking beam with a target pattern optical element and creating a corresponding target pattern on a two-dimensional sensor array comprises the step of receiving the tracking beam with the target pattern optical element and creating the corresponding target pattern on an active pixel sensor array.

25. The method defined in claim 24 further comprising the step of initiating a read-out cycle at a central row of the active pixel sensor array, so that the alignment information is obtained more quickly than when the read-out cycle is initiated near the first row of said active pixel sensor array and so that the system can be aligned during the remainder of the cycle after the alignment information is obtained.

26. The method defined in claim 16 further comprising the step of performing initial alignment information acquisition and alignment adjustment for said system.

27. The method defined in claim 16 further comprising the step of performing coarse alignment information acquisition and alignment adjustment for said system.

28. The method defined in claim 16 further comprising the step of continuously performing fine alignment information acquisition and alignment adjustment for said system while said photodetector receives said data.

29. The method defined in claim 16 wherein the step of receiving data from the data beam with a photodetector comprises the step of receiving data from the data beam with a high-speed photodetector.

30. The method defined in claim 16 further comprising the step of analyzing information from said sensor array to extract communications data from said tracking beam.

* * * * *